United States Patent
Tropper

(10) Patent No.: US 6,871,562 B2
(45) Date of Patent: Mar. 29, 2005

(54) POWER STEERING SYSTEM FOR MOTOR VEHICLES

(75) Inventor: Willi Tropper, Vordersteinenberg (DE)

(73) Assignee: ZF Lenksysteme GmbH, Schwaebish Gmuend (DE)

(*) Notice: Subject to any disclaimer, the term of this patent is extended or adjusted under 35 U.S.C. 154(b) by 199 days.

(21) Appl. No.: 10/379,315

(22) Filed: Mar. 3, 2003

(65) Prior Publication Data

US 2004/0020705 A1 Feb. 5, 2004

(30) Foreign Application Priority Data

Mar. 2, 2002 (DE) .......................................... 102 09 370

(51) Int. Cl.[7] .............................................. F16H 35/00
(52) U.S. Cl. ..................... 74/388 PS; 74/425; 277/579; 277/581
(58) Field of Search ............................ 74/388 PS, 425; 277/579, 581, 305, 311, 327, 342, 548, 584, 589

(56) References Cited

U.S. PATENT DOCUMENTS

| | | | | |
|---|---|---|---|---|
| 4,438,679 A | * | 3/1984 | Lang et al. | .................... 91/370 |
| 4,872,393 A | * | 10/1989 | Rabe et al. | ................ 91/375 A |
| 5,299,649 A | * | 4/1994 | Sano et al. | .................. 180/400 |
| 6,065,561 A | * | 5/2000 | Howard | ....................... 180/441 |
| 2004/0182638 A1 | * | 9/2004 | Tatewaki et al. | ............. 180/444 |

* cited by examiner

Primary Examiner—David M. Fenstermacher
(74) Attorney, Agent, or Firm—Kenyon & Kenyon

(57) ABSTRACT

For a power steering system which has, as a recirculating ball steering, a worm shaft and, enclosing this, a working plunger which is to be actuated by a bead chain axially shiftably with respect to the worm shaft, an axial seal is provided for the annular gap between the working plunger and the worm shaft which has a multi-part arrangement, and which has two support rings and one sealing ring, engaging between the support rings, pointing in opposite directions and guided in an annular grove of the working plunger, the width of the annular groove being greater than the axial width of the axial seal at the support rings arranged adjacent to the sealing ring.

11 Claims, 1 Drawing Sheet

POWER STEERING SYSTEM FOR MOTOR VEHICLES

CROSS-REFERENCE TO RELATED APPLICATIONS

The present application claims priority to Application No. 102 09 370.9, filed in the Federal Republic of Germany on Mar. 2, 2002, which is expressly incorporated herein in its entirety by reference thereto.

FIELD OF THE INVENTION

The present invention relates to a power steering system.

BACKGROUND INFORMATION

Certain power steering systems are convention and described in the pamphlet "ZF-Lenkungen mit Zubehör und Pumpenprogramm" ("ZF Steering Systems With Accessories and Pump Program"), Publication No. G 7000 P-WH 4/97 of ZF Friedrichshafen AG, Geschaeftsbereich Lenkungstechnik (Steering Technology Department). The rotational motion initiated at the steering wheel is transmitted by the steering column and a worm shaft, situated as an extension of the former, with the aid of a continuous bead chain, to a plunger or piston enclosing the worm shaft which is able to have pressure exerted on it from both sides or ends, and the pressure exerted on it is controlled in dependence upon a rotational direction via a control slide that is integrated into the worm shaft and is adjustable as a function of the steering torque applied to it. The bead chain calls for a relatively large annular gap between the plunger guided in the housing, which is axially shiftable along the worm shaft and meshes by its external gearing with a steering sector shaft connected to the steering lever, and the worm shaft that is also supported in the housing, because of the mutual support on the worm shaft and the surrounding working plunger via the bead chain, and this gap has to be sealed so as to separate the working chambers. Sealing is accomplished using an axial seal which, in view of the rotatability of the worm shaft with respect to the working plunger at additional axial shiftability and relatively high pressure differences between the pressure chambers, is exposed to high loads, and all this along with a relatively large annular gap and a high radial prestress of the seal required with respect to the pressure differences to be controlled.

An object of the present invention is to provide a power steering system with respect to the arrangement of the seal to the effect that, with respect to the seal as well as the ring groove and the size of the annular gap's tolerance-insensitive construction, using simple arrangements, a seal may be created between the pressure chambers that may not be sensitive to wear, may be cost-effective and may have a durable service life.

SUMMARY

The above and other beneficial objects of the present invention may be achieved by providing a power steering system as described herein.

According to an example embodiment of the present invention, in which two support rings that are positioned to bridge a gap, are triangular in shape and are arranged in an annular groove are used, between the sides of which, which face each other and extend apart from each other against the groove base, a wedge-shaped sealing ring, starting from the groove base, engages, which has pressure applied to it by the pressure present on the high pressure side just as the low pressure side supporting ring, axially in the direction toward the low pressure side as well as radially, so that, via the support between the low pressure side support ring and the sealing ring, respectively, both a sealing boundary is created and an axial and a radial bracing is achieved as a function of pressure as elements acting as a sealing boundary of the ring seal. The example embodiment of the ring seal according to the present invention thus works having appropriate bracing due to the pressure present.

Additionally, the ring seal may be made up of simple elements which may also be developed differently as to the material used with regard to the stress (they may experience), for the support rings, e.g., materials being suitable that have relatively high resistance to wear and relatively great hardness, e.g., polyamides, while for the sealing ring, e.g., polytetrafluoroethylene, e.g., fiber-reinforced polytetrafluoroethylene, etc., may be suitable which may not require special processing of the groove base, so that the annular groove may be manufactured at low expense as a cut-in annular groove.

The support rings may be arranged as right angled triangles in cross-section, to which corresponds a sealing ring which may be arranged trapeze-shaped, within the framework of the present invention each of the corner regions being, e.g., cut off.

Further details, features and aspects of the present invention are explained below with reference to an exemplary embodiment and with reference to the figures.

DETAILED DESCRIPTION

Figure 1:
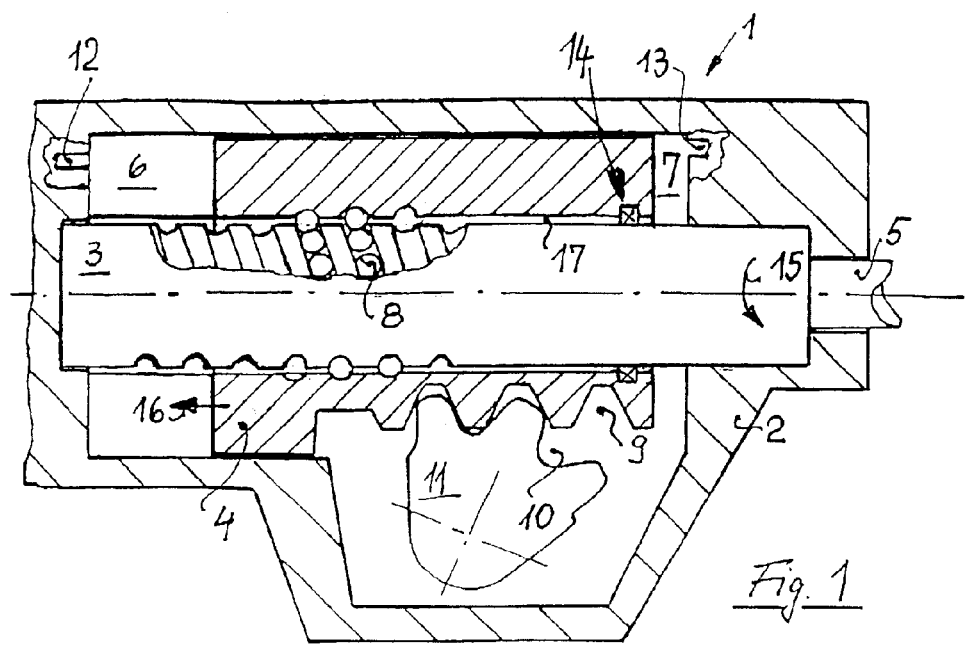
FIG. 1 is a schematic cross-sectional view of a steering gear of a recirculating ball steering system working with hydraulic support.

Schematically illustrated steering gear 1 illustrated in FIG. 1 has a housing 2 in which are coaxially arranged a worm shaft 3 and a working plunger 4 overlapping it. Worm shaft 3 connects to steering column 5 and it takes up a rotary valve via which, as a function of steering-relevant parameters, such as, e.g., the steering torque input at the driver's end via steering column 5, the hydraulic application on pressure chambers 6 and 7 is controlled which are separated by working plunger 4 and via which, depending on the application of pressure, working plunger 4 is axially loaded. The connection of working plunger 4 to worm shaft 3 is made via a bead chain 8, shown in part, so that, corresponding to the direction of rotation of steering column 5 or worm shaft 3, working plunger 4 is axially displaced as a function of the pressure difference in pressure chambers 6 and 7 corresponding to the pressure application by pressure chamber 6 or 7, whichever is under greater pressure, in the axial direction predefined by the input steering torque.

Working plunger 4 has a gearing 9 on its circumferential exterior, which meshes with gearing 10 of a steering-sector shaft 11, which is connected to the steerable wheels via a steering lever and subsequent steering linkages.

Figure 2:
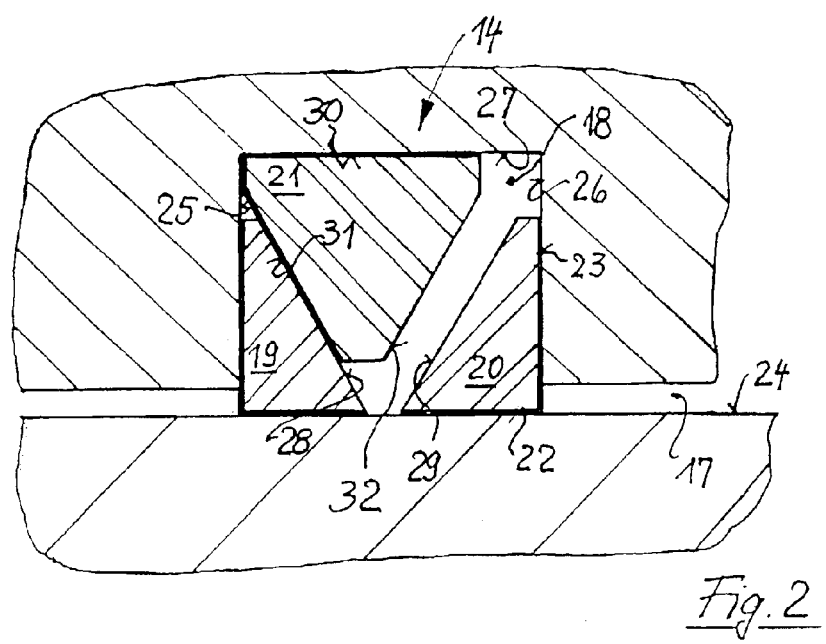
FIG. 2 illustrates, in an enlarged cutout illustration, positioning and arrangement of the seal overlapping the gap, which is provided between the working plunger and the steering worm.

The hydraulic connections associated with pressure chambers 6 and 7 are indicated schematically at 12 and 13, and, with reference to axial seal 14 illustrated in the cutout enlargement as illustrated in FIG. 2, pressure chamber 7 has pressure applied on the high pressure side between working plunger 4 and worm shaft 3, corresponding to a direction of rotation 15 of steering column 5, which corresponds to the displacement of working plunger 4 in the direction of arrow 16 along worm shaft 3. Between worm shaft 3 and working plunger 4, which are both supported in housing 2, extends bead chain 8, and there comes about an annular gap 17 which is to be sealed for separating pressure chambers 6 and 7 by axial seal 14, axial seal 14 having associated with it an annular groove 18 in working plunger 4, and axial seal 14 arranged sealingly adjacent to the circumference of worm shaft 3 from working plunger 4 over annular gap 17.

FIG. 2 illustrates the region of axial seal 14 illustrated in FIG. 1 on an enlarged scale, and the same reference numerals are used for the same parts.

In an example embodiment according to the present invention, axial seal 14 is arranged in several parts and includes two support rings 19 and 20, as well as a sealing ring 21. Support rings 19 and 20 in the exemplary embodiment are arranged the same as each other, having a right angled triangle cross-section, of sides 22 and 23 which are at right angles to each other, side 22 arranged adjacent to circumference 24 of worm shaft 3, and side 23, for support rings 19 and 20 which are the same as each other, arranged in each case adjacent to one of flanks 25 or 26 of U-shaped annular groove 18, the groove base of which is denoted as 27. Support rings 19 and 20 are arranged in mirror image fashion with respect to a radial plane dividing annular groove 18, are supported radially inside via their respective side 22 on circumference 24 of worm shaft 3 covering annular gap 17, and end radially outside at a distance from groove base 27, as illustrated in FIG. 2, the radially outer tips of the triangular cross-sections of supporting rings 19 and 20 having been lopped off. Sealing ring 21 is arranged between the sides 28 and 29 of support rings 19 and 20, which are arranged symmetrically opposite each other, extending between sides 22 and 23 and radially outward inclined to flanks 25 and 26 respectively, and its base 30 is associated with groove base 27, and its sides 31 and 32 delimit an isosceles triangle at an inclination to base 30 corresponding to that of sides 28 and 29, in the exemplary embodiment the corners of the triangular sealing ring being lopped off, and its basic form being a trapezium.

The length of base 30 of sealing ring 21 is shorter than the width of annular groove 18, so that, in the previously described construction, sealing ring 21 is axially shiftable with respect to groove base 27, and with respect to support rings 19 and 20 which are arranged adjacent to groove flanks 25 and 26, respectively. With regard to the initial condition described with reference to FIG. 1, having pressure applied to pressure chamber 7 on the high pressure side, looking at the drawing as illustrated in FIG. 2, there prevails to the right of annular groove 18 a higher pressure than to the left of annular groove 18, which has the result that, when there is a change in the application of pressure, that is, when excess pressure builds up in pressure chamber 7 relative to pressure chamber 6, support ring 20 lifts off from groove flank 26 and frees the inflow to the groove chamber, whereby sealing ring 21 is arranged adjacent to support ring 19, and support ring 19 has (pressure) applied to it both by sealing ring 21 and also directly by the axial and radial application of pressure and is thus sealingly pressed against groove flank 25 and also against the circumference 24 of worm shaft 3. When the direction of rotation of the steering column is reversed, and, corresponding to that, displacement direction 16 as well as the application of pressure are reversed, corresponding circumstances occur.

Support rings 19, 20 may be made of a plastic material that is relatively hard and resistant to wear, such as of a polyamide, and having an inside diameter which results in a sliding seal at a tight tolerance to worm shaft 3, and this seal is strengthened as a function of the pressure buildup in annular groove 18, the cooperation of sealing ring 21 with the respective support ring that has pressure applied to it—in FIG. 2 with support ring 19 which is associated with the under-pressure side—being independent of fluctuations in the absolute magnitude of annular gap 17 during centric association of worm shaft 3 and working plunger 4, as also in the case of excentric positions, ensuring a secure sealing.

For sealing ring 21, polytetrafluoroethylene may be provided as the material, e.g., polytetrafluoroethylene having a fiber insert or scrim, such as a glass fiber insert of 20%, which, because of its good sliding properties, at sufficient resistance to wear, may ensure easy shiftability against groove base 27 without special processing requirements on the surface of groove base 27, even given a certain prestress of sealing ring 21.

Sides 31 and 32 of sealing ring 21 may enclose an angle of an order of magnitude of 60 degrees, and consequently a corresponding inclination of sides 28 and 29 of support rings 19 and 20 to the circumference of the worm shaft.

An example embodiment of axial seal 14 according to the present invention may make it possible to mount its elements, namely support rings 19 and 20 and sealing ring 21 at comparatively low prestress or rather, almost without prestress, since the bracing necessary for the sealing function may be strengthened as a function of pressure, so that stress-related material fatigue and stress-related material or plastic flow may be avoided. Because of the radial play possible for the axial seal, for example, for evening out excentricities, without having to pay attention to having a perfect sealing function, compression conditions with respect to the axial seal, which are able to lead to damage, may also be avoided, the frictional work connected with such excentricities being able to be held low by the suitable choice of material for support rings 19 and 20 on the one hand, and sealing ring 21 on the other hand. The selection described of polyamides for support rings 19 and 20 and polytetrafluoroethylene for the sealing ring representing a possible pairing of materials in this regard.

What is claimed is:

1. A power steering system for a motor vehicle, comprising:

a housing;

a driven worm shaft arranged in the housing;

a bead chain;

a working plunger arranged in the housing coaxial to the worm shaft and arranged axially shiftably braced against the worm shaft via the bead chain, the working plunger arranged to have pressure applied thereto at both ends;

a ring seal; and an annular gap extending between the worm shaft and the working plunger in a transition from pressure chambers separated by the working plunger to the ring seal guided in an annular groove and covering the annular gap;

wherein the ring seal is arranged as a multi-part axial seal including two gap-covering support rings braced shiftably against groove flanks and axially spaced apart from each other and a sealing ring braced axially shiftably against a groove base and between the support rings, the support rings having a triangular cross-section, the sealing ring having the form of a wedge.

2. The power steering system according to claim 1, wherein the sealing ring has a substantially isosceles triangular cross-section.

3. The power steering system according to claim 2, wherein the sealing ring has substantially equal-sided trapezium cross-section.

4. The power steering system according to claim 1, wherein cross-sections of the support rings are equal.

5. The power steering system according to claim 1, wherein the support rings have a substantially right-angle triangular cross-section.

6. The power steering system according to claim 1, wherein the support rings are made of plastic.

7. The power steering system according to claim 1, wherein the support rings are made of polyamide.

8. The power steering system according to claim 1, wherein the sealing ring is made of plastic.

9. The power steering system according to claim 1, wherein the sealing ring is made of polytetrafluoroethylene.

10. The power steering system according to claim 1, wherein the sealing ring is made of fiber-reinforced polytetrafluoroethylene.

11. The power steering system according to claim 1, wherein the support rings are made of a material more rigid to pressure than a material of the sealing ring.

* * * * *

UNITED STATES PATENT AND TRADEMARK OFFICE
CERTIFICATE OF CORRECTION

PATENT NO. : 6,871,562 B2
DATED : March 29, 2005
INVENTOR(S) : Tropper et al.

It is certified that error appears in the above-identified patent and that said Letters Patent is hereby corrected as shown below:

<u>Column 1,</u>
Line 17, change "systems are convention" to -- systems are conventional --;
Line 18, change "ZF-Lenkungen mit Zubehor" to -- ZF-Lenkungen mit Zubehör --; and <u>Column 5,</u>
Lines 7-8, change "ring has substantially equal-sided trapezium cross-section" to -- ring has a substantially equal-sided trapezium cross-section. --.

Signed and Sealed this

Third Day of January, 2006

JON W. DUDAS
*Director of the United States Patent and Trademark Office*